Figure 1:
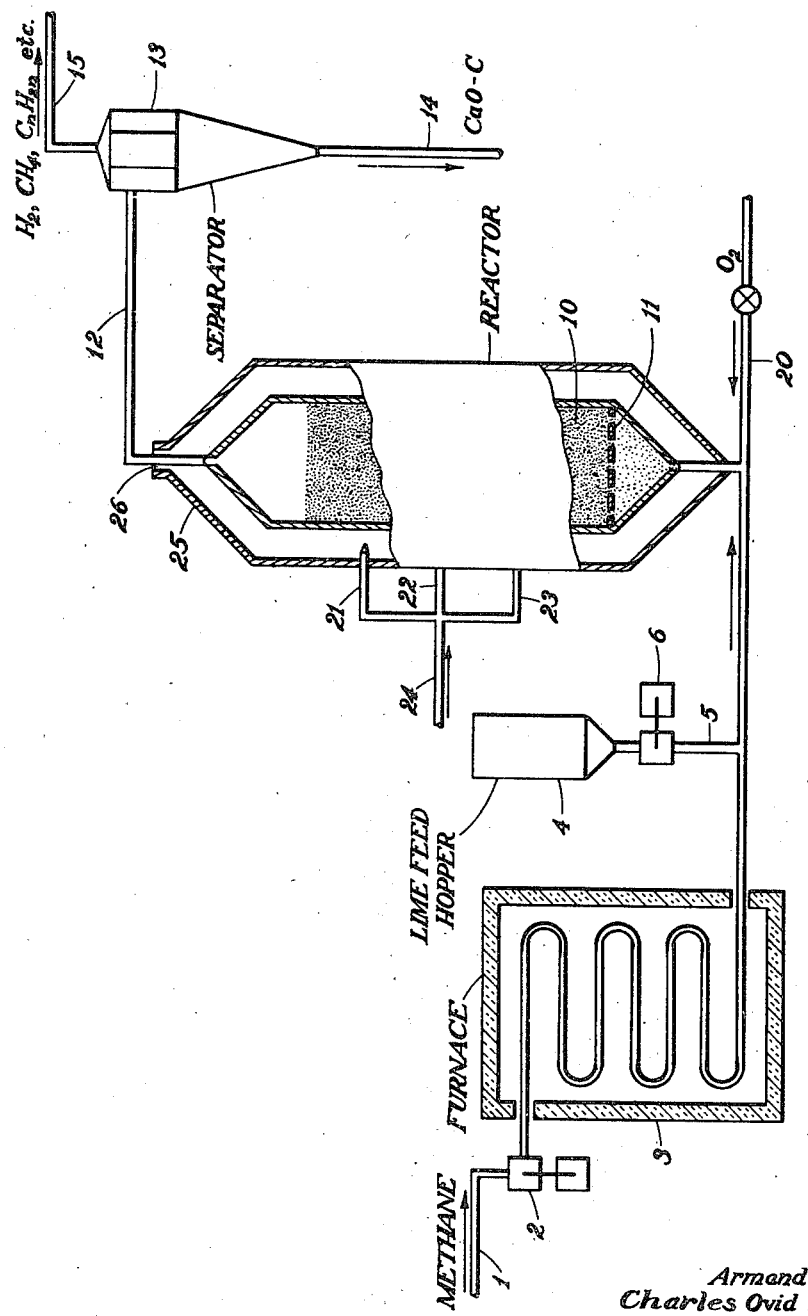

Jan. 21, 1947.  A. J. ABRAMS ET AL  2,414,625
PROCESS OF IMPREGNATING LIME PARTICLES WITH CARBON
Filed July 15, 1944   2 Sheets-Sheet 1

Armand J. Abrams
Charles Ovid Baker
Carl S. Kuhn, Jr.
Lorid G. Sharp
INVENTORS
BY Sidney A. Johnson
ATTORNEY

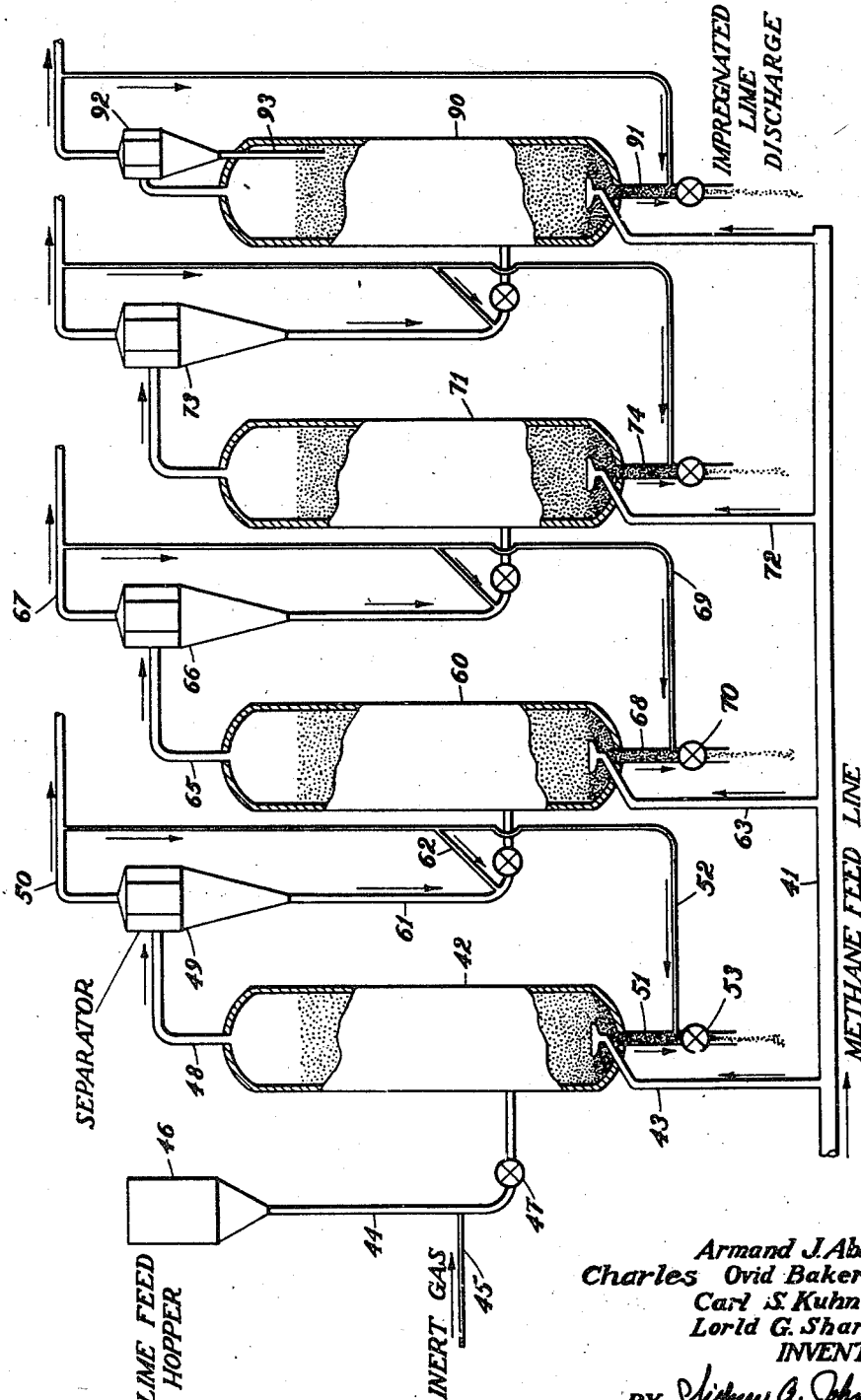

Patented Jan. 21, 1947

2,414,625

UNITED STATES PATENT OFFICE 2,414,625

PROCESS OF IMPREGNATING LIME PARTICLES WITH CARBON

Armand J. Abrams, Charles Ovid Baker, Carl S. Kuhn, Jr., and Lorld G. Sharp, Dallas, Tex., assignors, by mesne assignments, to Socony-Vacuum Oil Company, Incorporated, New York, N. Y., a corporation of New York Application July 15, 1944, Serial No. 545,046

4 Claims. (Cl. 252—190)

This invention is concerned with a method for the utilization of hydrocarbon gases and especially hydrocarbon gases which are predominantly methane, such as, for example, natural gas. The invention relates more particularly to the use of such gases for the production of particles of calcium oxide impregnated with carbon having unique properties, such as, excellent resistance to weathering, high strength and good electrical conductivity, and of utility wherever the simultaneous presence of carbon and lime are required.

The production of carbon impregnated lime particles has been disclosed in copending application Serial Number 419,238, now Patent Number 2,380,008, filed November 15, 1941 by Armand J. Abrams and Louis B. Cook. According to the process disclosed in said application a normally gaseous hydrocarbon, such as natural gas, is passed countercurrently through a bed of lime particles in a pyrolyzing zone at a temperature between 800 and 1500° C., and preferably between 850 and about 1150° C. in the substantial absence of extraneous gases. The hydrocarbon is cracked to form free carbon which is deposited on and distributed throughout the individual lime particles. The lime is left within the pyrolyzing zone for a period of time sufficient to deposit carbon in the individual particles to a mol ratio of at least 1 to 1, and generally the individual particles are subjected to contact with the hydrocarbon being pyrolyzed until they are impregnated with from 2 to 4 moles of carbon per mol of lime. The carbon impregnated lime is then removed from the bottom of the pyrolyzing zone and fresh lime added to the top. The time required for the individual particles in descending through the pyrolyzing zone in the bed countercurrently to the stream of ascending hydrocarbon gas to become sufficiently impregnated with carbon varies with the temperature which, of course, is an important factor in determining the rate of cracking of the normally gaseous hydrocarbon to carbon.

While the process disclosed in the copending case above referred to gives satisfactory formation of the calcium oxide particles impregnated with carbon, we have found that improved results particularly with respect to over-all rate of carbon impregnation, temperature uniformity and control, heat input to pyrolyzing zone and freedom from sticking of the particles together and coking may be obtained by operating the process with the lime particles suspended in the gaseous hydrocarbons in the pyrolyzing zone. Pyrolyzing temperatures between 850° C. and 1300° C. may be used with practical rates of carbon deposition, although with methane, due to its unreactive nature we prefer temperatures above about 1000° C. An essential requirement of the process is that the particles of lime be of a size sufficiently small to be capable of suspension in the gas stream at some reasonable space velocity of the hydrocarbons.

An object of our invention is to impregnate lime particles with carbon in a mole ratio of at least 1 to 1 by the pyrolysis of normally gaseous hydrocarbons, particularly natural gas, wherein a more efficient utilization of the carbon content of the hydrocarbon is obtained, in a highly economical manner.

A further object is to provide an economical method of supplying heat to the methane or other normally gaseous hydrocarbon undergoing pyrolysis in the presence of finely divided lime particles, wherein difficulties in overheating and coking are substantially eliminated.

Still another object of our invention is to produce carbon from normally gaseous hydrocarbons in a form available for use at an economical rate and in high yield.

Other and further objects of our invention will be readily apparent from the description thereof and from the appended claims.

Our invention may be better understood by a study of the accompanying drawings and the specific examples illustrating the operation thereof. The description of the operation of the invention and the specific examples are to be considered as illustrative of our invention, and our invention is not to be considered as limited to the use of any particular apparatus.

The drawings are diagrammatic illustrations of apparatus suitable for carrying out the invention.

Referring to Figure 1, methane or natural gas in line 1 is pumped by pump 2 under moderate pressure through heater 3 wherein it is preheated nearly up to the desired pyrolysis temperature, for example to about 975° C. Lime particles, of a suitable size, say 20 to 50 mesh, are then fed into the stream of hot methane from hopper 4 through line 5 at a regulated rate by means of a pump, such as a conventional Fuller-Kinyon pump 6. The hot methane with the lime particles suspended therein is then blown into reactor 10 provided with a perforated plate 11 in its hopper-shaped base through which the lime bearing methane stream passes to insure even distribution in the reaction chamber. Reactor 10 may be of any suitable size as from 2 to 5 feet in diameter and from 10 to 40 feet in length.

The rate of methane flow and the diameter of the reactor should, however, be so correlated that the lime particles will be suspended in the gas stream in the reaction zone. This type of operation with a suspended solid in a gas stream will be well understood by those familiar with the art, and is similar to fluid catalytic cracking of gas oils, wherein the term "hindered settling" has been applied to the buoying action exerted by the upflowing gas stream on the solid particles. In reactor 10, the mass of lime particles, suspended in the gas stream, slowly moves up through the reaction zone as fresh lime is continuously fed in. After the reactor has reached steady state operations, lime particles impregnated with carbon are carried out the top of the reactor through pipe 12, to cyclone separator 13, at the same average rate as fresh lime is fed into the reactor. In separator 13 the carbon impregnated lime particles are separated from unreacted methane and the gas produced in situ such as hydrogen and any other hydrocarbons as ethylene, acetylene and the like formed in the reaction. The impregnated lime particles are withdrawn from the bottom of the cyclone separator through line 14 while the gases are taken off and recovered through line 15.

Since the reaction $CH_4 \rightarrow C+2H_2$ is highly endothermic, heat must be supplied to the reaction zone to maintain it at the proper temperature for the reaction. Initially, methane alone may be fed into the reactor in admixture with air, admitted through valved line 20, to preheat the reactor by combustion of the methane. The air stream may then be cut off when the lime particles are admitted. During operation, heat may be supplied to the reaction zone by externally heating the walls of the reactor by means of burners 21, 22 and 23 supplied with a combustible gas mixture through line 24. The hot products of combustion collecting in the space between the outside wall of reactor 10 and a suitable shell 25 are vented at the top through a suitable opening 26. The heat value of these hot combustion gases may be used as desired, for example to supply heat for preheating the methane in furnace 3.

In operation our process may be carried out using lime particles from about ¼ inch average diameter (3 mesh) down to 300 mesh or finer, e. g., 400 mesh. We have found that material within the range of from 20 to 100 mesh gives satisfactory results.

The upward linear velocity of the methane in the reaction zone should be so selected relative to the particular size of lime particles chosen to suspend the particles freely in the gas stream, yet not be high enough to cause the particles to be blown en masse out of the reaction zone. This effect has been termed "hindered settling" and because of this phenomenon we have what we term a "floating bed" of lime particles suspended in the rising stream of gas.

Interrelated with the proper correlation of the linear velocity of the natural gas through the free space in the reaction zone to keep the lime particles suspended are such factors as contact time of the natural gas, space velocity of the gas, diameter of the reaction zone, height of the "floating bed" of lime particles, percentage of free space (voids) in the "floating bed" of lime particles, residence time of the lime particles in the reaction zone in contact with the hydrocarbons undergoing pyrolysis, and rate of feed or rate of discharge of the particles. Some of these factors such as the linear gas velocity and the lime particle size may be varied only over limits dictated by the "hindered settling" phenomenon. Other factors such as contact time of the gas and residence time of the lime may be varied over wide limits consistent with getting the type of product desired.

The residence time for the lime particles in the reaction zone must be at least thirty minutes to produce our novel impregnated lime particles at optimum hydrocarbon-to-carbon cracking temperatures. Since other temperatures are frequently used, since gas space velocities are generally preferable giving a high conversion of the methane throughput rather than a high formation of carbon per unit time, and since a carbon-lime mol ratio of greater than 1 to 1 is generally desired, residence times for the lime particles in excess of one hour are generally used. We have found, for example with methane at a pyrolyzing temperature of 1100° C., that about 40 minutes is required to impregnate the individual particles with one mol of carbon per mol of calcium oxide at optimum rates of carbon deposition. At lower temperatures and/or lower space velocities of the methane gas, longer residence times of the individual lime particles in contact with the hydrocarbon gases being pyrolyzed are required. At higher temperatures somewhat shorter residence times are required up to about 1200 to 1300° C., depending somewhat upon the nature of the normally gaseous hydrocarbon, above which further increases in temperature require longer residence times.

The linear velocity of the upwardly travelling hydrocarbon gases is fixed within fairly definite limits by the size and distribution of the lime particles to be suspended by "hindered settling." The lime particles should be of fairly uniform size (although by operating in the manner shown diagrammatically in Figure 2 considerable variation in size may be tolerated, as hereinafter described). With lime particles predominantly sized from about 60 to 100 mesh a linear gas velocity of methane between 1 and 5 feet per second gives satisfactory operation. With finer particles, of say predominantly 200 to 325 mesh, linear velocities as low as 0.2 foot per second are satisfactory. The choice of suitable linear velocities for "hindered settling" of the lime particles will be readily apparent to those skilled in the art.

At a given linear gas velocity, the contact time of the hydrocarbon in the reaction zone in contact with the "floating bed" of lime particles may be varied by varying the height of the bed.

The methane cracking reaction should be conducted at about atmospheric pressures. Therefore the pressure of the gas in the reaction zone should be maintained at relatively low values, from a few pounds gage to several atmospheres are satisfactory.

Since the reaction is endothermic and heat is preferably supplied to the reaction zone by transfer through the walls of the reactor, we prefer to use reactors of from about 1 to about 5 feet in internal diameter. By limiting the diameter greater uniformity of temperature is obtained throughout the reaction zone, and we have found that temperature gradients utilizing the "floating bed" principle may be obtained of as low as 20° C. or even lower. The maintenance of uniform temperature and "aeration" of the particles is important since otherwise, particularly at average temperatures above 1100° C., coking is apt to occur causing the reactor to clog up due to bridging together of the lime particles. This is apparently caused by a shift in the nature of the cracking reaction from one occurring within the pores of the lime particles to a purely thermal, gas phase cracking reaction. While we do not wish to limit our invention to any theoretical consideration, we believe that the unique character of our product is due to the nature and situs of the cracking reaction. It is believed that the lime surface exerts some catalytic action upon the cracking reaction, making it occur preferentially within the porous lime particles themselves. This is evidenced by the fact that considerably more material will crack in the presence of the lime particles than under purely thermal conditions at any given temperature. However, as the temperature of the reaction zone is raised, particularly at temperatures above 1100° C., appreciable thermal cracking becomes evident. If the gas undergoing pyrolysis picks up sufficient heat to reach these cracking temperatures, carbon will form. Since gases are poor heat transfer agents, however, this need not change the situs of the cracking reaction; the important feature of the invention. The principal source of heat for bringing the hydrocarbon up to cracking temperatures, and for the pyrolysis reactions will be by heat transfer from the individual lime particles. At the higher temperatures, i. e., above 1100° C. or 1150° C., the predominant carbon formation will still be within the porous lime particles. According to these theoretical considerations, undesirable thermal cracking, not in contact with the lime surfaces should be capable of elimination or reduction to any desired degree by suitable adjusting of the space velocity of the methane so that it is not within the hot reaction zone long enough to reach cracking temperatures except by contact with the surfaces of the lime particles. In any event we have found that the undesirable deposition of loose carbon may be practically eliminated at the higher temperatures, above 1150° C., by suitably increasing the space velocity.

In order to illustrate our process the following experiments on the pyrolysis of methane in the presence of a "floating bed" of lime particles were performed under the conditions given and with the results recorded in the following table:

|  | Example No. | | |
| --- | --- | --- | --- |
|  | 1 | 2 | 3 |
| Temperature, ° C.[1] | 1,062 | 1,130 | 1,132 |
| Space velocity, min.⁻¹ | 17.0 | 17.0 | 4.1 |
| Contact time of methane, sec | 0.47 | 0.51 | 0.33 |
| Particle size, U. S. standard mesh | 60-80 | 30-40 | 60-80 |
| Time on stream, minutes | 185 | 330 | 450 |
| Final C/CaO mol ratio | 1.72 | 2.89 | 2.53 |
| Time in minutes required to reach C/CaO mol ratio of— | | | |
| 1.0 |  |  |  |
| 1.5 | 100 | 76 | 150 |
| 2.0 | 155 | 125 | 237 |
| 2.5 |  | 190 | 335 |
|  |  | 260 | 440 |
| Conversion of methane, pounds per 1000 cu. ft.: | | | |
| To carbon | 4.00 | 4.75 | 16.47 |
| To liquid hydrocarbons | 1.38 | 2.09 | 1.24 |
| To solid hydrocarbons | 0.18 | 1.14 | 0.65 |

[1] The value for temperature given represents the average temperature throughout the experiment in question measured at the center of the floating bed of lime particles.

The effect of space velocity (or contact time) upon the production of carbon is readily apparent from a comparison of Examples 2 and 3. Example 2 carried out at a space velocity of 17 volumes of methane per volume of catalyst per minute at a temperature of 1130° C. produced only 4.75 pounds of carbon per thousand cubic feet of methane; whereas, Example 3 carried out at the same temperature but at a space velocity of 4.1 per minute produced 16.47 pounds of carbon per thousand cubic feet of gas. Although the yield of carbon was higher per 1000 cu. ft. of methane converted at the lower space velocity, the rate of deposition on the lime was slower at the lower space velocity. This is shown by the fact that it required 150 minutes to reach a carbon to lime ratio of 1 to 1 at the lower space velocity whereas at the space velocity of 17 per minute this ratio of carbon to lime was obtained in approximately half the time. Also, at the higher space velocity, a somewhat higher yield of liquid hydrocarbon by-product was obtained. Obviously, there will be an economic balance which would determine the most economical rate at any particular temperature, depending upon the value of the methane, the value of the carbon-lime product, the heating costs and the value of the by-products, etc.

The effect of temperature, while not as marked over the range shown in the examples, may be seen by a comparison of Examples 1 and 2. At the higher temperature in Example 2 the conversion of methane to carbon and by-product hydrocarbons was higher. Also, the times required to reach an initial carbon-to-lime mol ratio of 1 to 1 indicate that the rate of carbon deposition at the lower temperature and same space velocity was about ⅓ less. As pointed out above, one of the major problems in carrying out a reaction in the presence of a suspended mass of powdered solids is that of uniformity in size of the suspended particles. The lime particles themselves, initially are difficult to grind to a uniform size and in order to obtain lime particles of sufficiently uniform size to suspend at a single velocity of gas as proposed in Figure 1 it may be necessary to discard an appreciable quantity of fines. In order to overcome this objection and to reduce the cost of preparing the lime particles fed to the process, it may be advantageous in many cases to operate in accordance with the procedure diagrammatically illustrated in Figure 2. In Figure 2, the process is shown as being carried out in a series of reactors with the flow of methane through each of the reactors in parallel and with the flow of the fine lime particles through the reactors in series.

Referring to Figure 2, preheated methane under moderately elevated pressure in line 41 is introduced into reactor 42 through line 43. Powdered lime of a considerable size variation, say 80 to 325 mesh, is introduced into an intermediate portion of the reactor 42 from standpipe 44. The powdered lime is maintained in a fluid condition in standpipe 44 by aeration at a low velocity, so that its density is greater than that of the bed of lime particles in the reaction zone, with an inert gas introduced through line 45. Because of the greater density of "fluidized solid" head in standpipe 44, it will flow by gravity into reactor 42. Additional powdered lime to make up for that introduced into reactor 42 is introduced into standpipe 44 via hopper 46. The gas introduced through line 45 should be inert since some of this gas will be introduced into the reaction zone along with the dense phase fluidized solid. A small portion of the gaseous effluent from the reactor may be used for the purpose, particularly after liquid hydrocarbon products contained therein are recovered as more fully described hereinafter. In this standpipe 44, the linear velocity of the gas should be low, of the order of a few thousandths to a few tenths feet per second, merely sufficient to keep the mass of particles mobile. The rate at which the dense phase is fed into reactor 42 may be controlled by a suitable valve 47 at the base of the methane standpipe. The space velocity of the methane flow in reactor 42 is adjusted so that the linear velocity of the methane is relatively high, sufficient to retain in suspension or "hindered settling" only the larger size particles, say 80 to 120 mesh in the reactor 43. At this space velocity substantially all of the smaller particles introduced through line 44 will be carried out of the top of the reactor through line 48 to a suitable separator, or series of separators, of the cyclone type 49, wherein the lime particles will be separated from the unconverted methane and gases produced in situ. The gases produced in situ will be discharged through line 50, from which the valuable products, hydrogen, liquid hydrocarbons and olefins may be recovered by any suitable means. The residual gas may be recovered and used for aeration of the standpipe or recycled, or both. The heat value of this gas may be used to preheat the incoming methane. The coarser particles remain in reactor 42 for a suitable period of time necessary to acquire the desired carbon content. The base of the reactor is provided with a restricted portion 51, which is aerated with a small amount of inert gas through line 52, which may be a portion of the product gases as shown, to create a dense phase. This dense phase may be drawn off at a rate regulated by valve 53.

The lime particles, which according to the original assumed values now would have a particle size of from about 120 to 325 mesh, will be introduced into a second reactor 60 at an intermediate zone as before via standpipe 61 which is aerated with a small portion of the product gas stream. Hot methane is introduced into the lower portion of reactor 60 through line 63. The conditions in reactor 60 would be maintained and operated similar to the conditions previously outlined for reactor 43, except that the linear velocity of the methane would be somewhat lower so as to retain in the dense, "hindered settled" phase the larger sized remaining particles. Here again, the finer particles would be quite rapidly carried out from the reactor through line 65 to another cyclone separator 66, wherein the lime particles carried over would be separated from the gas stream for further treatment. The methane and gaseous reaction products would be discharged for recovery from the cyclone separator 66 through line 67. After a suitable residence time of the particles in the dense phase, having a size of from say 120 to 200 mesh, to sufficiently impregnate them with carbon they would be discharged from the reactor 60 through line 68, aerated as before with a portion of the product gases, via line 69, at a rate corresponding to the rate at which this particular size range was fed into the reactor system. The rate of discharge would be regulated by a suitable control valve 70. The lime particles recovered from cyclone separator 66 could then be further treated in another reactor 71 with methane introduced through line 72 in a manner similar to that previously described in connection with the operation of reactors 42 and 60. In reactor 71, the larger sized particles remaining in the mixture recovered from separator 66, having a particle size of say from 200 to 270 mesh, would be subjected to "hindered settling," and the finer particles recovered from the effluent overhead gases by separator 73. The treated lime particles would be recovered from the reactor and discharged through aerated line 74. Ultimately there would be reached a particle size where substantially all of the remainder would be capable of "hindered settling" at a single gas velocity in some one reactor 90. From this final reactor, the impregnated particles would be recovered via aerated line 91 from the bottom. Fine particles carried out overhead from this last reactor would be separated from the product gases by cyclone separator 92, and returned to the dense phase in the reaction zone by means of leg 93, terminating below the level of the dense phase.

While such a combined use of the reactors as zones for carrying out the reaction and as particle size classifiers may seem uneconomical at first glance, and impractical as compared with the use of one or possibly 2 large reactors as utilized in the typical fluid catalytic process, it must be remembered that because of the much more rigid heat requirements of our process the maximum diameter of the reactors is relatively limited thus making the use of a relatively large number of reactors an essential for any large scale operation. Obviously the number of reactors shown in series in Figure 2 is purely illustrative and any number from 3 to 10 or more might prove most economical in various individual cases. The number of reactors through which the finer lime particles would be sent in series would, of course, depend upon the variation in size of the lime particles charged and the relative percentage of particles in the total mass that varies appreciably from the average.

As pointed out in the copending application, referred to above, the carbon impregnated lime particles have excellent resistance to weathering in contrast to ordinary lime and calcium carbide. This fact serves to distinguish our product from either an ordinary mixture of lime particles and carbon particles or ordinary calcium carbide, in both of which the calcium compound is very reactive with atmospheric moisture. Particles of lime which have been uniformly impregnated with carbon have been completely immersed in water for as long as three days without evidence of appreciable solution.

The carbon impregnated lime particles also have an excellent resistance to abrasion. This is not only a useful property in the product, but also represents an important contribution to the successful operation of our process utilizing the method of handling the particles in the pyrolyzing stream of hydrocarbons herein described. As mentioned previously, uniformity of particle size is highly desirable and particularly excessively wide variations in particle size of an appreciable percentage of the particles will render the "hindered settling" operation impossible in a practical manner. Lime particles themselves would not meet the requirements of the process, since they would be continuously broken up by attrition to a mixture of fines and coarse particles. Even operation in the manner proposed in Figure 2 would be impractical unless the mixture of sizes being handled remained substantially constant during the operation of the process. As we have found, however, the lime particles rapidly become impregnated with carbon so that the amount of lime at any one time in the reaction zone is small, and the time before each individual particle receives at least a surface coating is short. Unexpectedly therefore, we have found that lime may be handled in the manner proposed.

The unique character of the carbon impregnated lime particles is further shown by the electrical conductive properties of the particles. This is shown by the following table in which resistivity in ohms per centimeter is tabulated against the carbon-lime ratio of the particles upon which the resistivity were measured.

| Mol ratio C/CaO | Mol ratio CaO/C | Resistivity ohm-centimeter |
|---|---|---|
| 0.99 | 1.01 | 18.1 |
| 1.13 | 0.89 | 7.9 |
| 1.55 | 0.65 | 3.1 |
| 2.78 | 0.36 | 1.8 |
| 3.02 | 0.33 | 1.2 |
| 3.36 | 0.30 | 0.6 |
| Infinite [1] | 0 | 0.44 |

[1] For comparison purposes pure resistor carbon particles were tested under identical conditions.

These tests show that at carbon lime ratios of at least 1 to 1 the conductivity of the particles when uniformly impregnated is high, or the resistivity is low. Where the ratio of carbon to lime drops appreciably below 1 to 1, the resistivity rises very rapidly indicating that the impregnation is not complete and conduction of electric current must be through lime, a very poor conductor, to a considerable extent.

The foregoing description of our invention is to be considered as illustrative of the mode of operation thereof and many modifications will be apparent to those skilled in the art, therefore only such limitations should be imposed as are indicated in the appended claims.

We claim:

1. A process for the production of strong, weathering resistant particles of lime impregnated with carbon which comprises suspending the particles of lime in a stream of a predominantly methane containing natural gas undergoing pyrolysis in an indirectly heated reaction zone maintained at a temperature of from 1000° to about 1300° C., excluding from said zone other gases than the natural gas and gas produced in situ, maintaining said particles suspended in said natural gas stream in said reaction zone for a residence time of at least thirty minutes and until substantially uniformly impregnated with carbon in a mol ratio of carbon to lime of at least 1, and recovering the carbon impregnated lime particles.

2. A process for the production of strong, weathering resistant particles of lime impregnated with carbon which comprises suspending lime particles of a size of from about 3 to about 400 mesh in an upwardly flowing stream of a predominantly methane containing natural gas undergoing pyrolysis in an indirectly heated reaction zone maintained at a temperature of from 1000° to about 1300° C., excluding from said zone other gases than the natural gas and gases produced in situ, maintaining said particles suspended in said natural gas stream in said reaction zone for a residence time of at least thirty minutes and until substantially uniformly impregnated with carbon in a mol ratio of carbon to lime of at least 1, and recovering the carbon impregnated lime particles.

3. A process for the production of strong, weathering resistant particles of lime impregnated with carbon which comprises suspending the particles of lime in an ascending stream of a predominantly methane containing natural gas in a reaction zone, maintaining the average temperature of the suspended mass of lime particles in said zone within the range of from 1000° C. to 1300° C. solely by the transfer of heat inwardly through the walls defining said zone, continuously introducing natural gas at a temperature below 1000° C. to said zone while excluding from said zone other gases than those produced in situ, removing unconverted methane and gaseous reaction products from said zone, regulating the rates of gas introduction and removal so that the contact time of said natural gas in the heated reaction zone is insufficient for any substantial amount of the natural gas to become heated to a temperature at which pyrolytic decomposition will occur by heat transfer from the heated wall portion of the reaction zone, continuously introducing additional lime particles to the mass of suspended lime particles and continuously withdrawing lime particles from said mass, and regulating the said rates of particle introduced and withdrawal relative to the total mass of suspended lime particles that the residence time of said particles in said zone in contact with the natural gas stream is at least thirty minutes and sufficient under the temperature conditions prevailing and the space velocity of natural gas utilized to become substantially uniformly impregnated with carbon in a mol ratio of at least 1 to 1.

4. A process for the production of strong, weathering resistant particles of lime impregnated with carbon which comprises introducing a predominantly methane containing natural gas into the lower portion of an indirectly heated reaction zone, introducing particles of lime into the reaction zone, correlating the linear velocity of the rising gas stream in said reaction zone and the size of the lime particles so that at least a substantial portion of the particles will be substantially suspended by said rising gas stream, excluding from said zone other gases than the natural gas and gases produced in situ, maintaining the temperature of the gas stream and the suspended lime particles within said zone between 1000° C. and 1300° C., maintaining said suspended lime particles within said zone for a residence time of at least thirty minutes until substantially uniformly impregnated with carbon in a mol ratio of carbon to lime of at least one, and recovering said carbon impregnated lime particles.

ARMAND J. ABRAMS.
C. OVID BAKER.
CARL S. KUHN, Jr.
LORLD G. SHARP.